United States Patent [19]

Sakai

[11] Patent Number: 5,046,087
[45] Date of Patent: Sep. 3, 1991

[54] ATTENDANT CONSOLE FOR TELEPHONE EXCHANGE

[75] Inventor: Nobuyuki Sakai, Tokyo, Japan

[73] Assignee: Nec Corporation, Tokyo, Japan

[21] Appl. No.: 448,082

[22] Filed: Dec. 12, 1989

[30] Foreign Application Priority Data

Dec. 12, 1988 [JP] Japan ............................... 63-314110

[51] Int. Cl.⁵ ...................... H04M 1/27; H04M 1/53; H04M 3/42
[52] U.S. Cl. .................................... 379/201; 379/216; 379/267
[58] Field of Search ................ 379/201, 216, 157, 267

[56] References Cited

U.S. PATENT DOCUMENTS 4,613,730  9/1986  Fechalos et al. ............... 379/201 X
4,763,356  8/1988  Day, Jr. et al. ................. 379/201 X
4,788,720  11/1988 Brennan et al. ..................... 379/201

OTHER PUBLICATIONS

"Intelligent Telephone Sets", H. Strobel, *TELECOMMUNICATIONS*, Dec. 1980, pp. 59-61.
"An Interactive Touch Phone for Office Automation",
R. Hsing et al., *IEEE Communications Magazine*, vol. 23, No. 2, Feb. 1985, pp. 21-26.

Primary Examiner—Thomas W. Brown
Attorney, Agent, or Firm—Foley & Lardner

[57] ABSTRACT

An attendant console includes a memory section, an automatic operation data management section, a signal generation section, and an input/output signal processing section. The memory section stores automatic operation data representing whether call handling sequences are automatically operated. The automatic operation data management section sets the automatic operation data in the memory section in accordance with a keyboard operation performed by a console operator. The signal generation section generates a signal representing an event equivalent to a keyboard operation performed by the console operator in accordance with the automatic operation data read out from the memory section. The input/output signal processing section transmits a signal from the signal generation section and the keyboard to a telephone exchange, and receives a signal from the exchange.

7 Claims, 4 Drawing Sheets

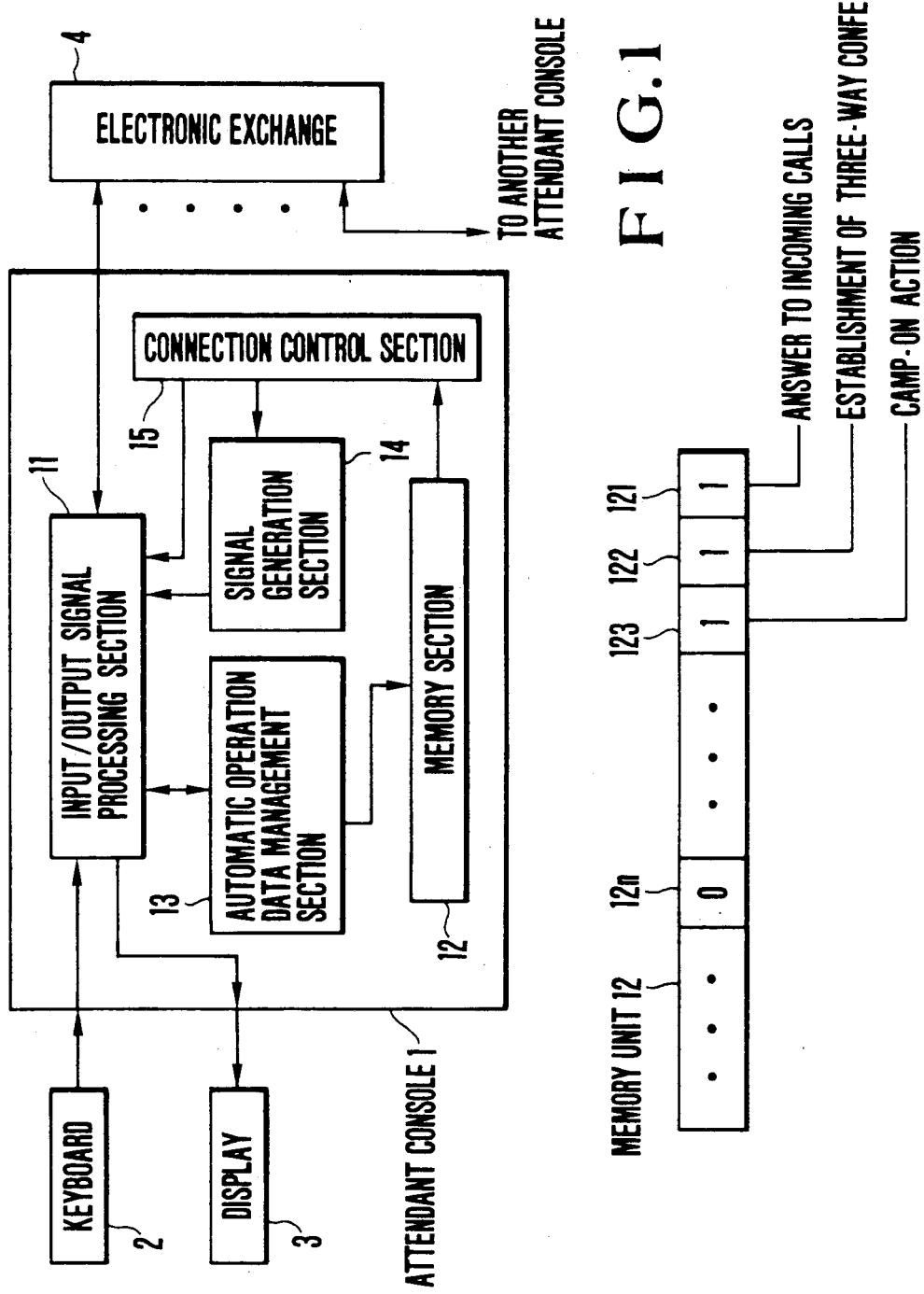

ATTENDANT CONSOLE FOR TELEPHONE EXCHANGE

BACKGROUND OF THE INVENTION

The present invention relates to an attendant console for a telephone exchange.

In a conventional exchange for an office, a centralized extention system, or a private branch, in order to reduce operation by an attendant console operator, automatic processing, for only strictly limited operation conditions in a call handling sequence such as answers to incoming calls and establishment of three-way conferences without the operator's key operation, is fixedly included as a control logic in a control program in a telephone exchange.

Since the above-mentioned conventional automatic operation is fixedly included in a control program in an exchange, an automatic operation corresponding to an individual request of each attendant console (operator) cannot be provided. In addition, in order to satisfy requests associated with the operation conditions for all the attendant consoles, a considerably large number of patterns for automatically operating the attendant consoles must be prepared. However, this is impractical. Furthermore, the automatic operation cannot be freely activated or deactivated during an operation of the console on demand.

SUMMARY OF THE INVENTION

It is a principal object of the present invention to easily provide call handling capabilities satisfying various requests from an attendant console (operator), to allow the console operators to individually set (activate/deactivate) automatic operation data, and to automatically handle the calls without actual key operations with no effect on control programs in an electronic exchange.

In order to achieve the above object, according to the present invention, there is provided an attendant console comprising first means for storing automatic operation data representing whether various call handling sequences are automatically operated, second means for setting the automatic operation data in the first means in accordance with a keyboard operation performed by a console operator, third means for outputting a signal representing an event equivalent to a keyboard operation performed by the console operator in accordance with the automatic operation data read out from the first means, and fourth means for transmitting a signal from the third means and the keyboard to a telephone exchange, and receiving a signal from the exchange.

BRIEF DESCRIPTION OF THE DRAWINGS

FIG. 1 is a block diagram showing an embodiment of the present invention;

FIG. 2 is a diagram showing an example of a format of automatic operation data according to the embodiment;

DETAILED DESCRIPTION OF THE PREFERRED EMBODIMENT

Figure 3:
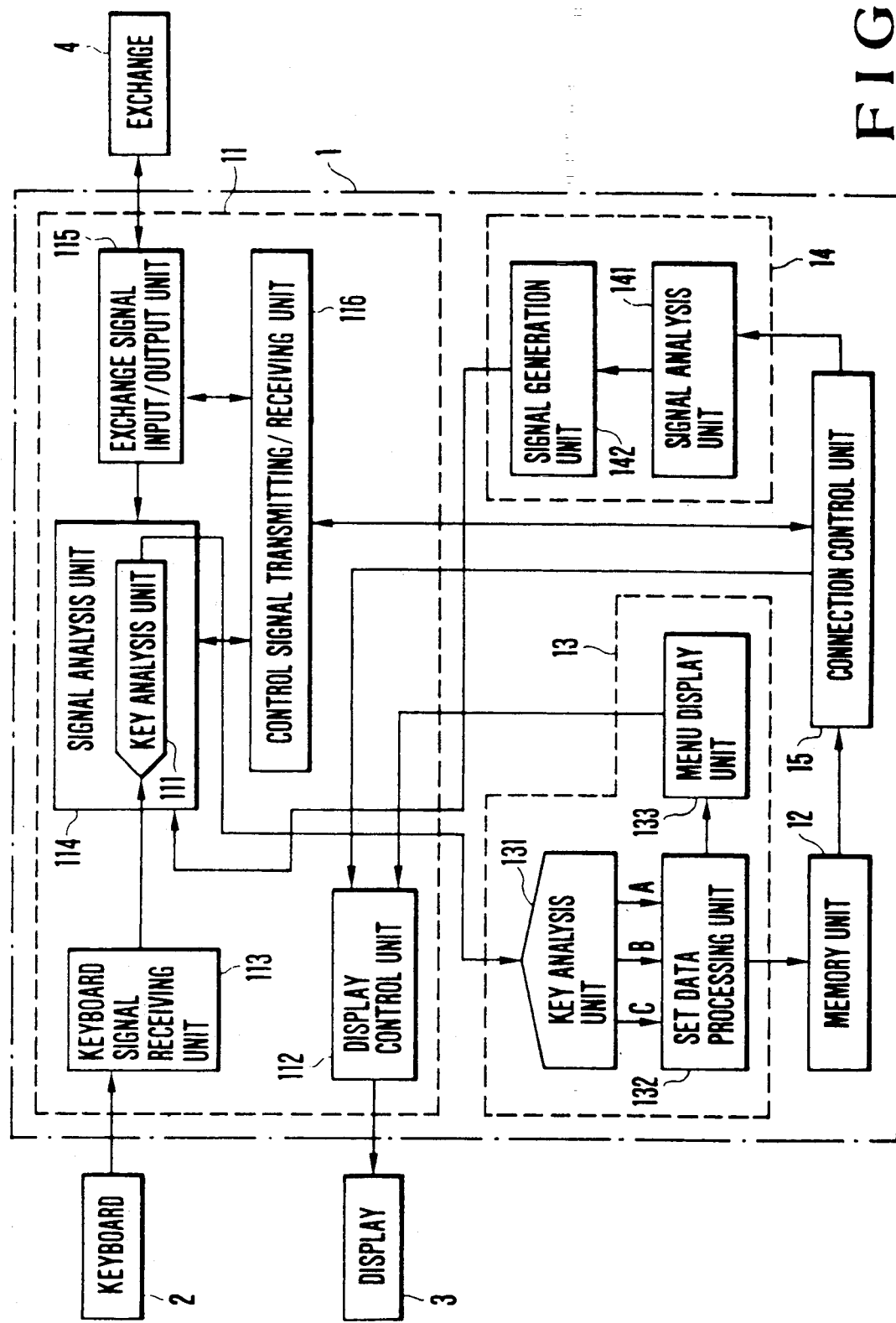
FIGS. 3 and 4 are block diagrams showing a detailed arrangement of an attendant console.

The present invention will be described hereinafter with reference to the accompanying drawings.

Referring to FIG. 1 showing an embodiment of the present invention, an attendant console 1 includes an input/output signal processing section 11 for controlling an input in accordance with a keyboard operation performed by an operator using a keyboard 2, a message output to a display 3, and transmission/reception of a console signal to/from a telephone exchange 4. The attendant console 1 also includes a memory section 12 for storing automatic operation data representing whether call handling sequences are automatically operated, an automatic operation data management section 13 for updating the contents of the memory section 12 in accordance with a keyboard operation performed by the operator, a signal generation section 14 for outputting a signal representing an event equivalent to the keyboard operation by the operator in accordance with the automatic operation data read out from the memory section 12, and a connection control section 15 for controlling the automatic operation in cooperation with each unit in the console 1.

Automatic operation data is stored in the memory section 12 in the attendant console 1, in a format as shown in FIG. 2. In this format, automatic operation data ("1"), representing that a call handling sequence is automatically operated without a keyboard operation by a operator, is stored in advance in memory areas 121, 122, and 123. Therefore, the attendant console 1 automatically operates an answer to incoming call, a establishment of three-way conference, or a camp-on service activation in call handling sequences.

FIG. 3 is a block diagram showing a detailed internal arrangement of the input/output signal processing section 11, the automatic operation data management section 13, and the signal generation section 14, in the attendant console 1.

When an operation start key on the keyboard 2, for managing automatic operation data, is depressed, the signal is received by keyboard signal receiving unit 113. a key analysis unit 111 of a signal analysis unit 114 analyzes that the depressed key is the operation key for managing automatic operation data. A key analysis unit 131 connected to the key analysis unit 111 further analyzes that the operation key is the start key and outputs an invocation/termination signal A. This signal is processed by a set data processing unit 132, and the processed signal is supplied to the display 3 through a menu display unit 133 and a display control unit 112, thus displaying a menu on the display 3.

When the operator sees the menu and depresses a service selection key on the keyboard 2, a service selection signal B is output from the key analysis unit 131. A call handling sequence to be automatically operated is selected in response to the signal B, and the selected call handling sequence is displayed on the display 3. Using the keys, the operator designates "ON" when this sequence is to be automatically operated, and the operator designates "OFF" when this sequence is to be manually operated. Then, an ON/OFF setting signal C is output from the key analysis unit 131, and is processed by the set data processing unit 132. Data representing an automatic operation of the selected call handling sequence is supplied to and stored in the memory section 12. Then, when an operation termination key is depressed, the invocation/termination signal A representing "terminates" is output. The updating of the automatic operation data is completed, and the menu on the display 3 disappears. Thus, as shown in FIG. 2, desired automatic operation data is stored in the memory section 12.

Using the automatic operation data in memory unit 12, when a key depression signal is input from the keyboard 2 to the input/output signal processing section 11, or an exchange signal is input from the exchange 4, the connection control unit 15 determines the call handling sequence is to be automatically operated.

In the input/output signal processing section 11, the key depression signal from the keyboard 2 is input to a signal analysis unit 114 through a keyboard signal receiving unit 113. The exchange signal supplied from the exchange 4 to the attendant console 1 is input to an exchange signal input/output unit 115. A control signal supplied from the connection control section 15 is input to a control signal transmitting/receiving unit 116 to control the signal analysis unit 114 and the exchange signal input/output unit 115, thus performing transmission/reception of the signals. Note that transmission of a signal from the attendant console 1 to the exchange 4 is also controlled. In addition, a signal analysis unit 141 in the signal generation section 14 receives a signal generation designation signal from the connection control section 15 to analyze this signal. A signal generation unit 142 produces, in response to the signal generation designation signal, a pseudo key signal representing an event equivalent to a case wherein the key on the keyboard 2 is depressed to supply the pseudo signal to the signal analysis unit 114 in the input/output signal processing section 11.

Figure 4:
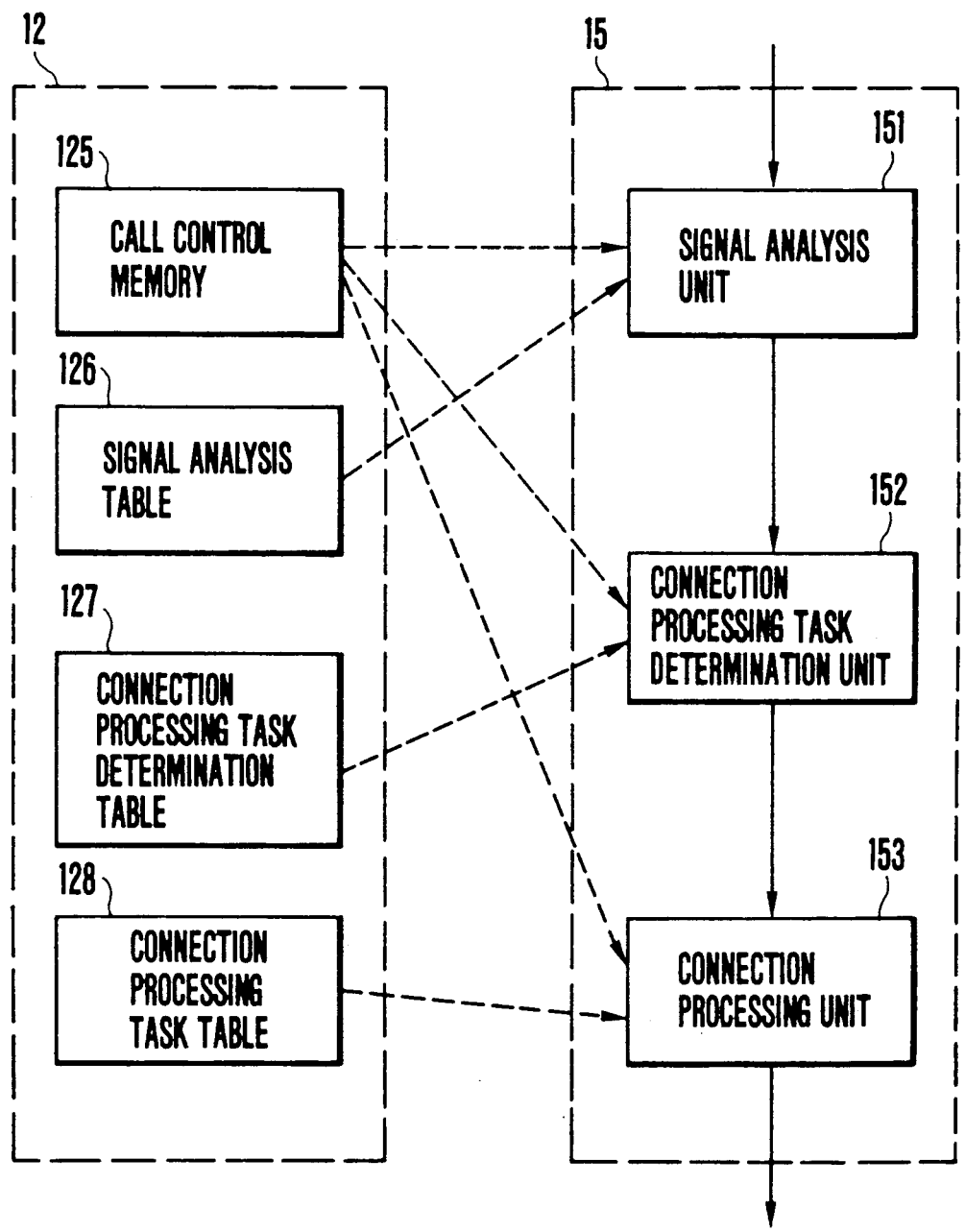

FIG. 4 is a block diagram of the connection control section 15 when signal transmission/reception is performed between the connection control section 15 and the control signal transmitting/receiving unit 116.

A signal analysis unit 151 receives and analyzes the key depression signal from the keyboard 2, the exchange signal from the exchange 4, the control signal, and the like. The analyzed signals are processed by a connection processing task determination unit 152 and a determined connection processing task is executed by a connection processing unit 153, and, as a result, control signals for performing a series of call connection control such as speech path and display control.

Note that in order to explain a state wherein the connection control section 15 reads data from each memory in the memory section 12 upon processing, the arrangement of the memory section 12 is shown in FIG. 4 for reference. Reference numeral 125 denotes a call control memory; 126, a signal analysis table; 127, a connection processing task determination table; and 128, a connection processing task table.

Note that, in the attendant console, there exist various call handling sequences such as an answer to an incoming call, holding of a loop, disconnection of a call, a call origination from the console, and transfer of a call. Among these call handling sequences, an answer to incoming calls, an establishment of three-way conference, a camp-on activation, a camp-on tone sending operation, a call holding operation, and the like can be set to be automatically operated without a key operation by an operator.

Figure 5:
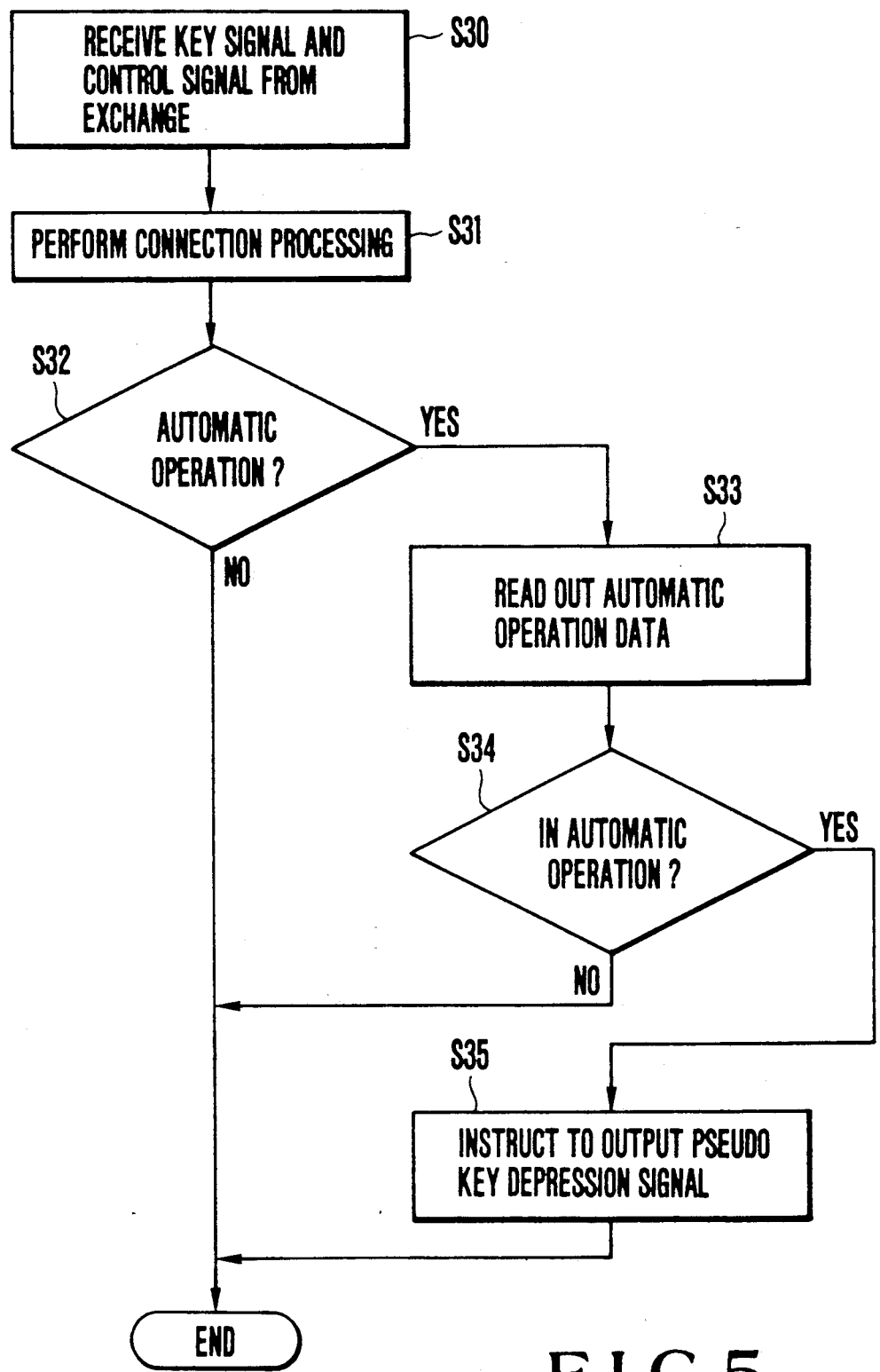
FIG. 5 is a flow chart for explaining automatic operation processing in the attendant console according to the embodiment.

FIG. 5 is a flow chart for explaining processing of the connection control section 15 in the attendant console 1. An operation will be described below with reference to FIGS. 1 to 5. As described above in detail with reference to FIG. 3, when the operator operates the keyboard 2 to activate an automatic operation of a call handling sequence, the processing of the automatic operation data management section 13 in the attendant console 1 results in the corresponding memory area in the memory section 12 to store automatic operation data in accordance with the request from the keyboard. The automatic operation can be deactivated in the same manner as in the above operation.

When the connection control section 15 in the attendant console 1 detects an event, e.g., reception of a key signal input by a key operation from the keyboard 2, or a control signal from the electronic exchange 4 (S30), connection processing corresponding to the internal state of the attendant console 1 at this time and the detected event is performed (S31), and waits for occurrence of a next event. This operation is repeated to realize a function of the attendant console 1. The connection control section 15 detects a call handling sequence to be automatically operated after the connection processing is executed (S32). If YES in step S32, that is, the call is in a sequence that can be automatically operated, automatic operation data is read out from the corresponding memory area in the memory section 12 (S33). If the operation which is being performed is stored in the memory section 12 as "Activated" ("1") in the memory section 12 (S34), the connection control section 15 causes the signal generation section 14 to output a pseudo key depression signal in order to automatically generate the same event as the case wherein a key is depressed, without a keyboard operation by the operator for the next operation (S35).

Note that, in step S32, it is determined whether the call handling sequence which may occur next is an operation that can be automatically operated. More specifically, the following operations can be automatically operated, as described above:

(1) an answer to an incoming call
(2) a establishment of three-way conference
(3) camp-on activation
(4) camp-on tone sending
(5) call holding The "automatic operation?" designation in step S32 represents that "operations (1) to (5) may occur?".

Detailed states corresponding to the above operations (1) to (5) will be described below as the states (1)' to (5)':

(1)' incoming call has terminated?
(2)' call has been extended?
(3)' destination party to which a call is to be extended is busy?
(4)' camp-on is activated?
(5)' call is connected?

Detailed call handling sequences are exemplified to explain the above operations. First, an example of an answer to an incoming call will be described below. Assume that a call set-up signal (an incoming call signal) which informs a termination of an incoming call from the telephone exchange 4 to the attendant console 1 is supplied (S30). When the operator operates a key in the keyboard 2 to answer the call, an answer key event normally occurs. In this attendant console 1, however, the connection control section 15 executes connection processing for an incoming call signal to the console (S31). Thereafter, "incoming call has terminated?" (1) is determined (S32), and the automatic operation data in the memory section 12 is referred (S33). Since the automatic operation data ("1") is stored in the memory area 121 corresponding to the answer to incoming calls (S34), an "automatic answer" is determined. The signal generation section 14 outputs a pseudo answer key signal equivalent to the keyboard operation by the operator in response to an instruction from the connection control section 15 (S35) to supply the answer key signal to the input/output signal processing section 11. Therefore, a signal corresponding to the answer key event is automatically supplied to the exchange 4 without an actual keyboard operation by the operator.

Note that when the automatic operation data is not stored in the memory area 121 in the memory section 12, and an answer to an incoming call is to be manually operated, "NO" is determined in step S34, and the automatic generation of the key signal does not occur. In this case, therefore, the operator depresses an answer key on the keyboard 2 to output an answer key signal. The attendant console 1 receives the answer key signal to execute answer operation processing, thus supplying a signal corresponding the answer key event to the exchange 4.

In the establishment of three-way conference, when the operator depresses a three-way conference key, as needed, after an extention subscriber is called in accordance with a request from an outside line subscriber, a three-way conference among the outside line subscriber, the operator, and the extention subscriber is normally set. However, since the automatic operation data ("1") is stored in the memory area 122 in the memory section 12, an event equivalent to a case wherein the three-way conference key is depressed is automatically generated.

In the camp-on activation, when the extention subscriber is busy, an event equivalent to a case wherein a camp-on key is depressed is automatically generated even if the operator does not depress the camp-on key because the automatic operation data ("1") is stored in the memory area 123 in the memory section 12.

As described above, according to the present invention, when automatic operation data representing whether various call handling sequences are automatically operated is provided, call handling operations can be easily and sophisticatedly customized in accordance with various requests from the attendant console (operator). In addition, the console operator can individually set (activate/deactivate) automatic operation data. Furthermore, the operator can automatically handle the calls without actual key operation with no affects on the control programs in the telephone exchange.

What is claimed is:

1. An attendant console comprising:
   first means capable of storing automatic operation data representing whether call handling sequences are automatically operated;
   second means for setting said automatic operation data into said first means in accordance with a keyboard operation performed by a console operation;
   third means for reading out said automatic operation data set in said first means and for outputting a signal representing an event equivalent to said keyboard operation performed by said console operator in accordance with said automatic operation data read out from said first means; and
   fourth means for transmitting said signal representing said event equivalent to said keyboard operation from said third means to a telephone exchange in response to a keyboard signal from a keyboard.

2. An attendant console according to claim 1, wherein said first means comprises a memory section, said second means comprises an automatic operation data management section, said third means comprises a signal generation section, and said fourth means comprises an input/output signal processing section.

3. An attendant console according to claim 2, wherein said memory section includes a set of memory areas, each of said memory areas capable of storing said automatic operation data representing whether call handling sequences are automatically operated.

4. An attendant console according to claim 3, wherein said call handling sequences include an answer to an incoming call, an establishment of a three-way conference, camp-on activation, camp-on tone sending, and call holding.

5. An attendant console according to claim 2, wherein said automatic operation data management section includes a key analysis unit, a set data processing unit, and a menu display unit.

6. An attendant console according to claim 2, wherein said signal generation section includes a signal analysis unit and a signal generation section.

7. An attendant console according to claim 2, wherein said input/output signal processing section includes a key analysis unit, a display control unit, a keyboard signal receiving unit, a signal analysis unit, an exchange signal input/output unit, and a control signal transmitting/receiving unit.

* * * * *